(12) United States Patent
Nakamura

(10) Patent No.: US 6,291,633 B1
(45) Date of Patent: Sep. 18, 2001

(54) POLYAMIDE RESIN COMPOSITIONS WITH EXCELLENT WELD STRENGTH

(75) Inventor: Ken Nakamura, Yamaguchi (JP)

(73) Assignee: UBE Industries, Inc., Yamaguchi Prefecture (JP)

( * ) Notice: Subject to any disclaimer, the term of this patent is extended or adjusted under 35 U.S.C. 154(b) by 0 days.

(21) Appl. No.: 09/479,684

(22) Filed: Jan. 7, 2000

(30) Foreign Application Priority Data

Jan. 8, 1999 (JP) .................................................. 11-002671
Jan. 8, 1999 (JP) .................................................. 11-002672

(51) Int. Cl.$^7$ ............................. C08G 69/26; C08K 3/40; C08L 77/00
(52) U.S. Cl. .......................... 528/310; 528/170; 528/322; 528/332; 528/339; 524/397; 524/447; 524/449; 524/451; 524/494; 524/496; 524/606
(58) Field of Search ..................................... 528/339, 310, 528/322, 170, 332, 606, 397, 447, 449, 451, 464, 496; 5289/332

(56) References Cited

U.S. PATENT DOCUMENTS

| | | | |
|---|---|---|---|
| 3,962,524 | * 6/1976 | Miyamoto et al. | 428/474.5 |
| 5,194,577 | * 3/1993 | Chen | 528/338 |
| 5,371,132 | * 12/1994 | Ebara et al. | 524/413 |
| 5,414,043 | * 5/1995 | Yasue et al. | 524/789 |

FOREIGN PATENT DOCUMENTS

| | | |
|---|---|---|
| 55-62959 | 5/1980 | (JP) . |
| 5-112672 | 5/1993 | (JP) . |
| 6-172643 | 6/1994 | (JP) . |
| 7-149947 | 6/1995 | (JP) . |

\* cited by examiner

*Primary Examiner*—P. Hampton-Hightower
(74) *Attorney, Agent, or Firm*—Akin, Gump, Strauss, Hauer & Feld, L.L.P.

(57) ABSTRACT

A molding polyamide resin composition with excellent weld strength is disclosed which comprises: 100 parts by weight of a polyamide resin comprising from 95 to 55 wt % crystalline, partly aromatic copolyamide resin containing one kind of aromatic monomer units and/or crystalline aliphatic polyamide resin and from 5 to 45 wt % polyamide resin comprising units derived from a xylylenediamine and units derived from an aliphatic dicarboxylic acid or noncrystalline, partly aromatic copolyamide resin containing at least two kinds of aromatic monomer units; and from 5 to 200 parts by weight of an inorganic filler.

13 Claims, No Drawings

POLYAMIDE RESIN COMPOSITIONS WITH EXCELLENT WELD STRENGTH

FIELD OF THE INVENTION

The present invention relates to polyamide resin compositions excellent in not only mechanical properties and moldability but weld strength. These resin compositions are used as molding materials for automotive parts and electrical/electronic parts.

BACKGROUND OF THE INVENTION

Filler-reinforced polyamides are extensively used as industrial materials because of their high strength and rigidity. However, reinforced polyamides in which the resin consists of one or more crystalline polyamides alone have insufficient weld strength and, hence, there are cases where applications thereof are limited. This is because molded parts thereof having many welds or molded parts or products thereof in which the welds are required to have a high safety factor have problems, for example, that they break or crack at welds or suffer considerable deterioration at welds in a high-temperature or high-humidity atmosphere or under high load.

On the other hand, in the case of reinforced polyamides in which the resin consists of one or more noncrystalline polyamides alone, molded objects obtained therefrom have sufficient weld strength. However, applications of these reinforced polyamides also are limited because they require a long molding time.

A known technique for eliminating the above problems is to improve weld strength by using a copolymer having a low melting point, such as, e.g., polyamide 6/66. However, this technique has a drawback that the composition not only has insufficient absolute strength but is reduced in heat and chemical resistance.

JP-A-5-112672 (the term "JP-A" as used herein means an "unexamined published Japanese patent application") proposes a technique for weld strength improvement which comprises adding a specific acicular filler to a thermoplastic resin such as a polyamide. However, molded parts of this composition have insufficient strength in parts other than welds, i.e., have insufficient base material strength, although the weld strength is improved in some degree. This background art composition is hence unusable as structural parts required to have high base material strength.

JP-A-7-149947 proposes a technique for weld strength improvement which comprises adding a silicone rubber to a thermoplastic resin reinforced with a fibrous filler. However, this composition is reduced in rigidity and heat resistance although improved in weld strength.

JP-A-55-62959 and JP-A-6-172643 each proposes a technique which comprises adding an aromaticpolyamide. However, the technique disclosed in JP-A-55-62959 necessitates the addition of a large amount of an aromatic polyamide and is hence unable to give an inexpensive composition. In addition, this background art is intended to improve surface gloss and there is no description therein to the effect that weld strength is improved. The technique disclosed in JP-A-6-172643 is insufficient in weld strength improvement because an aromatic dicarboxylic acid is used as crystallinity-imparting monomer in producing the aromatic polyamide.

SUMMARY OF THE INVENTION

An object of the present invention is to provide molding polyamide resin compositions which have suitability for fast-cycle molding and retain calcium chloride resistance and high weld strength even in a high-temperature high-humidity atmosphere, under high load, etc., to thereby eliminate the above-described drawbacks of background art techniques.

The present inventors made intensive investigations in order to overcome the problems described above. As a result, they have found that the above object can be accomplished by adding a polyamide resin formed from a xylylenediamine and an aliphatic dicarboxylic acid to a crystalline polyamide. The present invention has thus been achieved.

The present inventors have further found that the above object can be accomplished also by adding a noncrystalline polyamide having a specific structure to a crystalline polyamide. The present invention has thus been achieved.

The present invention provides a molding polyamide resin composition with excellent weld strength which comprises:

100 parts by weight of a polyamide resin comprising (A-1) a crystalline, partly aromatic copolyamide resin containing one kind of aromatic monomer units and/or (A-2) a crystalline aliphatic polyamide resin 95–55 wt % and (B-1) a polyamide resin comprising units derived from a xylylenediamine and units derived from an aliphatic dicarboxylic acid 5–45 wt %;

and from 5 to 200 parts by weight of (C) an inorganic filler.

The present invention further provides a molding polyamide resin composition with excellent weld strength which comprises:

100 parts by weight of a polyamide resin comprising (A-1) a crystalline, partly aromatic copolyamide resin containing one kind of aromatic monomer units and/or (A-2) a crystalline aliphatic polyamide resin 95–55 wt % and (B-2) a noncrystalline, partly aromatic copolyamide resin containing at least two kinds of aromatic monomer units 5–45 wt %;

and from 5 to 200 parts by weight of (C) an inorganic filler.

In the present invention, polymers which show a distinct peak in DSC (differential scanning calorimetry) are defined as "crystalline" polymers, while polymers not showing a distinct peak in DSC are defined as "noncrystalline" polymers.

DETAILED DESCRIPTION OF THE INVENTION

The crystalline, partly aromatic copolyamide resin containing one kind of aromatic monomer units used as ingredient (A-1) in the present invention is a copolyamide containing one kind of aromatic monomer units, e.g., units derived from an aromatic dicarboxylic acid such as terephthalic acid, isophthalic acid, or naphthalenedicarboxylic acid. Ingredient (A-1) is preferably a crystalline, partly aromatic copolyamide resin containing one kind of aromatic monomer units and having a melting point of from 260 to 320° C., excluding 320° C., and is more preferably a crystalline, partly aromatic copolyamide resin containing one kind of aromatic monomer units and having a melting point of from 290 to 316° C., excluding 316° C.

A monomer combination for the preferred, crystalline, partly aromatic copolyamide resin containing one kind of aromatic monomer units, ingredient (A-1), comprises an equimolar salt of an aliphatic diamine with an aliphatic dicarboxylic acid, and an equimolar salt of an aliphatic diamine with an aromatic dicarboxylic acid, and optionally at least one monomer forming an aliphatic polyamide.

Examples of the aliphatic diamine include those having 4 to 12 carbon atoms, such as tetramethylenediamine, hexamethylenediamine, octamethylenediamine, nonamethylenediamine, undecamethylenediamine, and dodecamethylenediamine.

Examples of the aliphatic dicarboxylic acid include those having 6 to 12 carbon atoms, such as adipic acid, heptanedicarboxylic acid, octanedicarboxylic acid, nonanedicarboxylic acid, undecanedicarboxylic acid, and dodecanedicarboxylic acid.

Preferred is an equimolar salt of hexamethylenediamine with adipic acid.

Examples of the aromatic dicarboxylic acid include terephthalic acid, isophthalic acid, and naphthalenedicarboxylic acid. Preferred is an equimolar salt of hexamethylenediamine with terephthalic acid.

Examples of the monomer forming an aliphatic polyamide include aminocarboxylic acids having 6 to 12 carbon atoms and lactams having 6 to 12 carbon atoms. Specific examples thereof include 6-aminocaproic acid, 7-aminoheptanoic acid, 11-aminoundecanoic acid, 12-aminododecanoic acid, α-pyrrolidone, ε-caprolactam, laurolactam, and ε-enantholactam. Preferred of these are 6-aminocaproic acid, 11-aminoundecanoic acid, 12-aminododecanoic acid, ε-caprolactam, and laurolactam. Such monomers forming an aliphatic polyamide may be used either alone or as a mixture of two or more thereof.

The use amounts of the equimolar salt of hexamethylenediamine with adipic acid, the equimolar salt of hexamethylenediamine with terephthalic acid, and the monomer forming an aliphatic polyamide are generally from 30 to 70 wt %, from 70 to 30 wt %, and from 0 to 15 wt %, respectively, and are preferably from 35 to 55 wt %, from 65 to 45 wt %, and from 0 to 10 wt %, respectively.

The crystalline aliphatic polyamide resin used as ingredient (A-2) in the present invention is one formed from an aliphatic diamine and an aliphatic dicarboxylic acid or from a lactam or an aminocarboxylic acid, or is a copolymer of two or more of these monomers.

Examples of the aliphatic diamine include those having 4 to 12 carbon atoms, such as tetramethylenediamine, hexamethylenediamine, octamethylenediamine, nonamethylenediamine, undecamethylenediamine, and dodecamethylenediamine.

Examples of the aliphatic dicarboxylic acid include those having 6 to 12 carbon atoms, such as adipic acid, heptanedicarboxylic acid, octanedicarboxylic acid, nonanedicarboxylic acid, undecanedicarboxylic acid, and dodecanedicarboxylic acid.

Preferred is an equimolar salt of hexamethylenediamine with adipic acid.

Examples of the lactam include those having 6 to 12 carbon atoms, and examples of the aminocarboxylic acid include those having 6 to 12 carbon atoms. Specific examples thereof include 6-aminocaproic acid, 7-aminoheptanoic acid, 11-aminoundecanoic acid, 12-aminododecanoic acid, α-pyrrolidone, ε-caprolactam, laurolactam, and ε-enantholactam. Preferred of these are 6-aminocaproic acid, 11-aminoundecanoic acid, 12-aminododecanoic acid, ε-caprolactam, and laurolactam.

The polyamide resin comprising units derived from a xylylenediamine and units derived from an aliphatic dicarboxylic acid used as ingredient (B-1) in the present invention is a polyamide which contains units derived from at least one aromatic diamine such as m-xylenediamine or p-xylenediamine and is an equimolar salt thereof with an aliphatic dicarboxylic acid having 6 to 12 carbon atoms. Examples of the aliphatic dicarboxylic acid include adipic acid, heptanedicarboxylic acid, octanedicarboxylic acid, nonanedicarboxylic acid, undecanedicarboxylic acid, and dodecanedicarboxylic acid.

This polyamide resin comprising xylylenediamine units and aliphatic dicarboxylic acid units is preferably an equimolar salt of m-xylenediamine with adipic acid.

In the present invention, the crystalline, partly aromatic copolyamide resin containing one kind of aromatic monomer units (A-1) and/or the crystalline aliphatic polyamide resin (A-2) is blended with the polyamide resin comprising xylylenediamine units and aliphatic dicarboxylic acid units (B-1) in such a ratio that the proportion of resin (A-1) and/or resin (A-2) and that of resin (B-1) are generally from 95 to 50 wt % and from 5 to 50 wt %, respectively, preferably from 90 to 60 wt % and from 10 to 40 wt %, respectively, more preferably from 90 to 70 wt % and from 10 to 30 wt %, respectively.

Use amounts of the polyamide resin (B-1), comprising xylylenediamine units and aliphatic dicarboxylic acid units, larger than the upper limit specified above are undesirable in that crystallization is retarded to impair suitability for fast-cycle molding.

If the total use amount of the polyamide resin (B-1), comprising xylylenediamine units and aliphatic dicarboxylic acid units, is smaller than 5 wt %, the effect of improving weld strength is insufficient and the object of the present invention cannot be accomplished.

The noncrystalline, partly aromatic copolyamide resin containing at least two kinds of aromatic monomer units used as ingredient (B-2) in the present invention is a polyamide resin containing units derived from at least one aromatic compound, e.g. terephthalic acid or a heteroaromatic compound, besides units derived from isophthalic acid. This noncrystalline, partly aromatic copolyamide resin is preferably a noncrystalline polyamide whose glass transition temperature which is the loss modulus peak temperature determined through a dynamic viscoelastic examination of an absolute-dry sample thereof is 100° C. or higher. More preferably, ingredient (B-2) is a noncrystalline polyamide comprising two or more equimolar salts of an aliphatic diamine with an aromatic dicarboxylic acid.

Examples of the aliphatic diamine include those having 4 to 12 carbon atoms, such as tetramethylenediamine, hexamethylenediamine, octamethylenediamine, nonamethylenediamine, undecamethylenediamine, and dodecamethylenediamine.

Examples of the aromatic dicarboxylic acid include terephthalic acid, isophthalic acid, and naphthalenedicarboxylic acid. A preferred combination comprises an equimolar salt of hexamethylenediamine with terephthalic acid and an equimolar salt of hexamethylenediamine with isophthalic acid.

The use amounts of the equimolar salt of hexamethylenediamine with isophthalic acid and the equimolar salt of hexamethylenediamine with terephthalic acid are generally from 90 to 60 wt % and from 10 to 40 wt %, respectively, preferably from 80 to 65 wt % and from 20 to 35 wt %, respectively.

In the present invention, the crystalline, partly aromatic copolyamide resin containing one kind of aromatic monomer units (A-1) and/or the crystalline aliphatic polyamide resin (A-2) is blended with the noncrystalline, partly aromatic copolyamide resin containing at least two kinds of aromatic monomer units (B-2) in such a ratio that the proportion of resin (A-1) and/or resin (A-2) and that of resin (B-2) are generally from 95 to 50 wt % and from 5 to 50 wt %, respectively, preferably from 90 to 60 wt % and from 10 to 40 wt %, respectively, more preferably from 90 to 70 wt % and from 10 to 30 wt %, respectively.

Use amounts of the noncrystalline, partly aromatic copolyamide resin (B-2) larger than the upper limit specified above are undesirable in that crystallization is retarded to impair suitability for fast-cycle molding.

If the total use amount of the noncrystalline, partly aromatic copolyamide resin (B-2) is smaller than 5 wt %, the effect of improving weld strength is insufficient and the object of the present invention cannot be accomplished.

Examples of the inorganic filler (C) used in the present invention include fibrous inorganic materials such as glass fibers, carbon fibers, wollastonite, and potassium titanate whiskers, inorganic fillers such as montmorillonite, talc, mica, calcium carbonate, silica, clay, glass powders, and glass beads, and organic fillers such as various organic or polymeric powders. Preferred of these are glass fibers and talc. More preferred are glass fibers.

The fibrous inorganic materials have a fiber diameter of generally from 0.01 to 20 $\mu$m, preferably from 0.03 to 15 $\mu$m, and a fiber length of generally from 0.5 to 10 mm, preferably from 0.7 to 5 mm.

The use amount of the inorganic filler (C) in the present invention is generally from 5 to 200 parts by weight, preferably from 10 to 150 parts by weight, more preferably from 10 to 100 parts by weight, per 100 parts by weight of the polyamide resin to be obtained. If the amount of the inorganic filler is smaller than 5 parts by weight, the polyamide resin cannot have sufficiently improved mechanical strength. Amounts thereof larger than 200 parts by weight are undesirable in that the composition tends to have impaired moldability and a poor surface state although the mechanical strength thereof is sufficient.

Function-imparting agents can be incorporated into the compositions of the present invention as long as the incorporation thereof does not defeat the object of the invention. Examples thereof include a heat stabilizer, weathering agent, nucleating agent, crystallization accelerator, release agent, antistatic agent, flame retardant, flame retardant aid, e.g., antimony trioxide, and coloring pigment.

Specific examples of such ingredients are as follows. Examples of the heat stabilizer include hindered phenols, phosphites, thioethers, and copper halides. These may be used alone or in combination of two or more thereof.

Examples of the weathering agent include hindered amines and salicylates. These may be used alone or in combination of two or more thereof.

Examples of the nucleating agent include inorganic fillers such as talc and clay and organic nucleating agents such as metal salts of fatty acids. These may be used alone or in combination of two or more thereof.

Examples of the crystallization accelerator include low-molecular weight polyamides, higher fatty acids, esters of higher fatty acids, and higher aliphatic alcohols. These may be used alone or in combination of two or more thereof.

Examples of the release agent include metal salts of fatty acids, fatty acid amides, and various waxes. These may be used alone or in combination of two or more thereof.

Examples of the antistatic agent include aliphatic alcohols, esters of aliphatic alcohols, and esters of higher fatty acids. These may be used alone or in combination of two or more thereof.

Examples of the flame retardant include metal hydroxides such as magnesium hydroxide, phosphorus, ammonium phosphate, ammonium polyphosphate, melamine cyanurate, ethylenedimelamine dicyanurate, potassium nitrate, brominated epoxy compounds, brominated polycarbonate compounds, brominated polystyrene compounds, tetrabromobenzylpolyacrylates, tribromophenol polycondensates, polybromobiphenyl ethers, and chlorine compound flame retardants. These may be used alone or in combination of two or more thereof.

Other thermoplastic resins can be added to the resin compositions of the present invention as long as the addition thereof does not defeat the object of the invention. Examples of such optionally usable resins include general resin materials such as polyethylene, polypropylene, polystyrene, ABS resins, AS resins, and acrylic resins, and further include polycarbonates, poly(phenylene oxide), poly(ethylene terephthalate), poly(butylene terephthalate), poly(phenylene sulfide), and other highly heat-resistant resins. Especially in the case where polyethylene or polypropylene is added, this polymer is desirably one which has been modified with maleic anhydride, a monomer containing glycidyl group, etc.

The resin compositions of the present invention each may be used in such a manner that the individual resins in pellet form are blended and the blend is melt-mixed and molded at the stage where a final product is obtained. Alternatively, the individual resins may be melt-mixed beforehand with a single- or twin-screw extruder, a Banbury mixer, or the like, before being subjected to molding. Thus, the compositions of the present invention can be used for extrusion or injection molding.

The compositions of the present invention can be used as molded objects such as, e.g., mechanism elements of engines, transmissions, and differential gears for motor vehicles, two-wheelers, etc., electrical equipment parts therefor, and electrical/electronic parts. Specific examples of these molded objects include mechanism elements such as an oil strainer, timing chain cover, rocker cover, timing chain tensioner, thrust washer, power steering tank, oil level gauge, brake fluid subtank, brake master cylinder, brake piston rod, automatic-transmission stator, bearing retainer, governor gear, and sensor, electrical equipment parts such as a relay box and connector, and electrical/electronic parts such as a terminal board, connector, and relay.

The present invention will be explained below in more detail by reference to Examples and Comparative Examples, but the invention should not be construed as being limited to these Examples.

The polyamide resin compositions obtained in the Examples and Comparative Examples were evaluated for properties by the following methods.
(Property Evaluations)
(Evaluation of Mechanical Properties)
The following properties were evaluated using dry samples for each evaluation.
(1) Tensile Strength: An ASTM #1 test piece having a thickness of 3.2 mm was tested in accordance with ASTM D638 at a pulling rate of 10 mm/min. In producing the ASTM #1 test piece by injection molding, the molten resin was injected into the mold from only one side thereof so as not to form a weld.

(2) Weld Tensile Strength: An ASTM #1 test piece having a thickness of 3.2 mm was tested in accordance with ASTM D638 at a pulling rate of 10 mm/min. In producing the ASTM #1 test piece by injection molding, the molten resin was injected into the mold from both ends thereof at the same flow rate so as to form a weld at the center of the test piece.

(Evaluation of Moldability)

(3) Gate Sealing Time: The sealing time for a gate having a width of 3 mm and a thickness of 2 mm was determined from the relationship between the weight of ASTM #1 dumbbell test pieces molded with the gate and holding time. Specifically, the test pieces were molded while the holding time was gradually prolonged, and the time at which the test piece weight came not to increase was taken as the gate sealing time.

(Evaluation of Environmental Resistance)

(4) Calcium Chloride Resistance: An ASTM #1 test piece was subjected to 24-hour immersion in 80° C. water as a pretreatment and then humidified for 1 hour in a thermo-hygrostatic chamber having a temperature of 90° C. and a humidity of 95% RH. Thereafter, saturated aqueous calcium chloride solution was applied to the weld, and this test piece was heat-treated in a 100° C. oven for 1 hour. The test piece was thus subjected to five cycles each consisting of the humidifying and the heat treatment. After completion of the five cycles, the weld was examined for cracks with a magnifying lens.

EXAMPLE 1

95 Parts by weight of polyamide 66 (2020B, manufactured by Ube Industries, Ltd.) was evenly mixed with 5 parts by weight of a polyamide resin formed from m-xylylenediamine and adipic acid (Reny 6001, manufactured by Mitsubishi Gas Chemical Co., Inc.; hereinafter referred to as PAMXD6). This mixture was kneaded with a 35-mmφ vented twin-screw extruder having a barrel temperature of 285° C. During the kneading, glass fibers (manufactured by Nippon Electric Glass Co., Ltd.; glass fiber diameter, 11 μm; glass fiber length, 3 mm) were fed at a part of the barrel in an amount of 40 parts by weight per 100 parts by weight of the polyamide resin mixture being kneaded. Thus, the target polyamide resin composition was produced. This composition was pelletized, subsequently dried at 110° C. and a reduced pressure of 10 Torr for 24 hours, and then injection-molded at a cylinder temperature of 270° C. and a mold temperature of 80° C. to produce ASTM #1 tensile test pieces and ASTM #1 test pieces for weld strength evaluation. These test pieces were evaluated, and the results obtained are shown in Table 1.

EXAMPLES 2 TO 6

Polyamide resin compositions were produced and evaluated for properties in the same manner as in Example 1, except that the feed amounts of polyamide 66 and PAMXD6 were changed as shown in Table 1. The results obtained are shown in Table 1.

EXAMPLE 7

A polyamide resin composition was produced and evaluated for properties in the same manner as in Example 3, except that polyamide 6 (1015B, manufactured by Ube Industries, Ltd.) was used instead of polyamide 66. Kneading was conducted at a barrel temperature of 270° C. and injection molding was conducted at a cylinder temperature of 230° C. and a mold temperature of 80° C. The results obtained are shown in Table 1.

EXAMPLE 8

A polyamide resin composition was produced and evaluated for properties in the same manner as in Example 3, except that polyamide 66/6T (8023X, manufactured by Ube Industries, Ltd.) was used instead of polyamide 66. Kneading was conducted at a barrel temperature of 320° C. and injection molding was conducted at a cylinder temperature of 305° C. and a mold temperature of 110° C. The results obtained are shown in Table 1.

EXAMPLE 9

A polyamide resin composition was produced and evaluated for properties in the same manner as in Example 3, except that polyamide 6/66 (2123B, manufactured by Ube Industries, Ltd.) was used instead of polyamide 66. Kneading was conducted at a barrel temperature of 285° C. and injection molding was conducted at a cylinder temperature of 270° C. and a mold temperature of 80° C. The results obtained are shown in Table 1.

EXAMPLE 10

A polyamide resin composition was produced and evaluated for properties in the same manner as in Example 3, except that talc (Talc Cup, manufactured by Nippon Talc Co., Ltd.) was used as an inorganic filler. The results obtained are shown in Table 1.

TABLE 1

| Resin Composition | | Example 1 | 2 | 3 | 4 | 5 | 6 | 7 | 8 | 9 | 10 |
|---|---|---|---|---|---|---|---|---|---|---|---|
| PA66 | (wt %) | 95 | 90 | 80 | 70 | 60 | 50 | | | | 80 |
| PA6 | (wt %) | | | | | | | 80 | | | |
| PA66/6T | (wt %) | | | | | | | | 80 | | |
| PA6/66 | (wt %) | | | | | | | | | 80 | |
| PAMXD6 | (wt %) | 5 | 10 | 20 | 30 | 40 | 50 | 20 | 20 | 20 | 20 |
| GF | (pts. wt.) | 40 | 40 | 40 | 40 | 40 | 40 | 40 | 40 | 40 | |
| Talc | (pts. wt.) | | | | | | | | | | 40 |
| Tensile strength | MPa | 172 | 172 | 176 | 173 | 176 | 181 | 162 | 188 | 162 | 113 |
| Weld tensile strength | MPa | 109 | 120 | 126 | 130 | 133 | 136 | 130 | 128 | 137 | 90 |
| Retention of weld tensile strength | % | 63 | 70 | 72 | 75 | 76 | 75 | 80 | 68 | 85 | 80 |

TABLE 1-continued

|  |  | Example | | | | | | | | | |
|---|---|---|---|---|---|---|---|---|---|---|---|
| Resin Composition |  | 1 | 2 | 3 | 4 | 5 | 6 | 7 | 8 | 9 | 10 |
| Gate sealing time | sec | 7 | 8 | 8 | 10 | 12 | 13 | 9 | 6 | 11 | 9 |
| Calcium chloride resistance | Cracking |  |  |  |  | not occurred | | | | | |

COMPARATIVE EXAMPLE 1

A polyamide resin composition was produced and evaluated for properties in the same manner as in Example 1, except that the polyamide resin formed from xylylenediamine and an aliphatic dicarboxylic acid was not used. The results obtained are shown in Table 2.

COMPARATIVE EXAMPLE 2

A polyamide resin composition was produced and evaluated for properties in the same manner as in Example 7, except that the polyamide resin formed from xylylenediamine and an aliphatic dicarboxylic acid was not used. The results obtained are shown in Table 2.

COMPARATIVE EXAMPLE 3

A polyamide resin composition was produced and evaluated for properties in the same manner as in Example 8, except that the polyamide resin formed from xylylenediamine and an aliphatic dicarboxylic acid was not used. The results obtained are shown in Table 2.

COMPARATIVE EXAMPLE 4

A polyamide resin composition was produced and evaluated for properties in the same manner as in Example 9, except that the polyamide resin formed from xylylenediamine and an aliphatic dicarboxylic acid was not used. The results obtained are shown in Table 2.

COMPARATIVE EXAMPLE 5

A polyamide resin composition was produced and evaluated for properties in the same manner as in Example 1, except that the proportion of polyamide 66 to polyamide MXD6 was changed as shown in Table 2. The results obtained are shown in Table 2.

TABLE 2

|  |  | Comparative Example | | | | |
|---|---|---|---|---|---|---|
| Resin Composition |  | 1 | 2 | 3 | 4 | 5 |
| PA66 (wt %) |  | 100 |  |  |  | 40 |
| PA6 (wt %) |  |  | 100 |  |  |  |
| PA66/6T (wt %) |  |  |  | 100 |  |  |
| PA6/66 (wt %) |  |  |  |  | 100 |  |
| PAMXD6 (wt %) |  |  |  |  |  | 60 |
| GF (pts. wt.) |  | 40 | 40 | 40 | 40 | 40 |
| Tensile strength | MPA | 170 | 165 | 189 | 158 | 177 |
| Weld tensile strength | MPa | 76 | 79 | 52 | 89 | 138 |
| Retention of weld tensile strength | % | 45 | 48 | 28 | 56 | 78 |
| Gate sealing time | sec | 5 | 6 | 4 | 9 | 19 |
| Calcium chloride resistance | Cracking | occurred | occurred | not occurred | occurred | not occurred |

The results given in Tables 1 and 2 show that too small proportions of resin (B-1) result in no effect of improving weld strength, while too large proportions of resin (B-1) result in impaired moldability because of retarded solidification within the mold.

EXAMPLE 11

95 Parts by weight of polyamide 66 (2020B, manufactured by Ube Industries, Ltd.) was evenly mixed with 5 parts by weight of polyamide 6I/6T (Grivory G21, manufactured by EMS-CHEMIE AG). This mixture was kneaded with a 35-mm$\phi$ vented twin-screw extruder having a barrel temperature of 285° C. During the kneading, glass fibers (manufactured by Nippon Electric Glass Co., Ltd.; glass fiber diameter, 11 $\mu$m; glass fiber length, 3 mm) were fed at a part of the barrel in an amount of 40 parts by weight per 100 parts by weight of the polyamide resin mixture being kneaded. Thus, the target polyamide resin composition was produced. This composition was pelletized, subsequently dried at 110° C. and a reduced pressure of 10 Torr for 24 hours, and then injection-molded at a cylinder temperature of 270° C. and a mold temperature of 80° C. to produce ASTM #1 tensile test pieces and ASTM #1 test pieces for weld strength evaluation. These test pieces were evaluated, and the results obtained are shown in Table 3.

EXAMPLES 12 TO 16

Polyamide resin compositions were produced and evaluated for properties in the same manner as in Example 11, except that the feed amounts of polyamide 66 and polyamide 6I/6T were changed as shown in Table 3. The results obtained are shown in Table 3.

EXAMPLE 17

A polyamide resin composition was produced and evaluated for properties in the same manner as in Example 13, except that polyamide 6 (1015B, manufactured by Ube Industries, Ltd.) was used instead of polyamide 66. Kneading was conducted at a barrel temperature of 270° C. and injection molding was conducted at a cylinder temperature of 230° C. and a mold temperature of 80° C. The results obtained are shown in Table 3.

EXAMPLE 18

A polyamide resin composition was produced and evaluated for properties in the same manner as in Example 13, except that polyamide 66/6T (8023X, manufactured by Ube Industries, Ltd.) was used instead of polyamide 66. Kneading was conducted at a barrel temperature of 320° C. and injection molding was conducted at a cylinder temperature of 305° C. and a mold temperature of 110° C. The results obtained are shown in Table 3.

EXAMPLE 19

A polyamide resin composition was produced and evaluated for properties in the same manner as in Example 13, except that polyamide 6/66 (2123B, manufactured by Ube Industries, Ltd.) was used instead of polyamide 66. Kneading was conducted at a barrel temperature of 285° C. and injection molding was conducted at a cylinder temperature of 270° C. and a mold temperature of 80° C. The results obtained are shown in Table 3.

EXAMPLE 20

A polyamide resin composition was produced and evaluated for properties in the same manner as in Example 13, except that talc (Talc Cup, manufactured by Nippon Talc Co., Ltd.) was used as an inorganic filler. The results obtained are shown in Table 3.

TABLE 3

| Resin Composition | | Example | | | | | | | | | |
|---|---|---|---|---|---|---|---|---|---|---|---|
| | | 11 | 12 | 13 | 14 | 15 | 16 | 17 | 18 | 19 | 20 |
| PA66 | (wt %) | 95 | 90 | 80 | 70 | 60 | 50 | | | | 80 |
| PA6 | (wt %) | | | | | | | 80 | | | |
| PA66/6T | (wt %) | | | | | | | | 80 | | |
| PA6/66 | (wt %) | | | | | | | | | 80 | |
| PA6I/6T | (wt %) | 5 | 10 | 20 | 30 | 40 | 50 | 20 | 20 | 20 | 20 |
| GF | (pts. wt.) | 40 | 40 | 40 | 40 | 40 | 40 | 40 | 40 | 40 | |
| Talc | (pts. wt.) | | | | | | | | | | 40 |
| Tensile strength | MPa | 170 | 173 | 175 | 172 | 176 | 180 | 166 | 189 | 165 | 110 |
| Weld tensile strength | MPa | 110 | 124 | 125 | 126 | 129 | 132 | 127 | 129 | 133 | 88 |
| Retention of weld tensile strength | % | 65 | 72 | 71 | 73 | 73 | 73 | 77 | 68 | 81 | 80 |
| Gate sealing time | sec | 7 | 8 | 8 | 10 | 12 | 13 | 9 | 6 | 10 | 9 |
| Calcium chloride resistance | Cracking | | | | | not occurred | | | | | |

Comparative Example 6

A polyamide resin composition was produced and evaluated for properties in the same manner as in Example 11, except that the noncrystalline, partly aromatic copolyamide resin as resin (B-2) was not used. The results obtained are shown in Table 4.

Comparative Example 7

A polyamide resin composition was produced and evaluated for properties in the same manner as in Example 17, except that the noncrystalline, partly aromatic copolyamide resin as resin (B-2) was not used. The results obtained are shown in Table 4.

Comparative Example 8

A polyamide resin composition was produced and evaluated for properties in the same manner as in Example 18, except that the noncrystalline, partly aromatic copolyamide resin as resin (B-2) was not used. The results obtained are shown in Table 4.

Comparative Example 9

A polyamide resin composition was produced and evaluated for properties in the same manner as in Example 19, except that the noncrystalline, partly aromatic copolyamide resin as resin (B-2) was not used. The results obtained are shown in Table 4.

Comparative Example 10

A polyamide resin composition was produced and evaluated for properties in the same manner as in Example 11, except that the proportion of polyamide 66 to polyamide 6I/6T was changed as shown in Table 4. The results obtained are shown in Table 4.

TABLE 4

| | Comparative Example | | | | |
|---|---|---|---|---|---|
| Resin Composition | 6 | 7 | 8 | 9 | 10 |
| PA66 (wt %) | 100 | | | | 40 |
| PA6 (wt %) | | 100 | | | |
| PA66/6T (wt %) | | | 100 | | |
| PA6/66 (wt %) | | | | 100 | |
| PA6I/6T (wt %) | | | | | 60 |
| GF (pts. wt.) | 40 | 40 | 40 | 40 | 40 |
| Tensile strength MPa | 170 | 165 | 189 | 158 | 175 |
| Weld tensile strength MPa | 76 | 79 | 52 | 89 | 140 |
| Retention of weld tensile strength % | 45 | 48 | 28 | 56 | 80 |

TABLE 4-continued

| | | Comparative Example | | | | |
|---|---|---|---|---|---|---|
| Resin Composition | | 6 | 7 | 8 | 9 | 10 |
| Gate sealing time | sec | 5 | 6 | 4 | 9 | 17 |
| Calcium chloride resistance | Cracking | occurred | occurred | not occurred | occurred | not occurred |

The results given in Tables 3 and 4 show that too small proportions of resin (B-2) result in no effect of improving weld strength, while too large proportions of resin (B-2) result in impaired moldability because of retarded solidification within the mold.

The polyamide resin compositions of the present invention combine high weld strength with excellent moldability while retaining the mechanical properties and heat and chemical resistance inherent in crystalline polyamide resins. Therefore, the compositions are usable as molding materials for producing structural parts of motor vehicles and two-wheelers, electrical equipment parts thereof, and electrical/electronic parts without necessitating any special molding machine or technique.

While the invention has been described in detail and with reference to specific embodiments thereof, it will be apparent to one skilled in the art that various changes and modifications can be made therein without departing from the spirit and scope thereof.

What is claimed is:

1. A molding polyamide resin composition which comprises 100 parts by weight of a polyamide resin comprising
    95 to 55 wt % of at least one resin selected from the group consisting of (A-1) a crystalline, partly aromatic copolyamide resin containing one kind of aromatic monomer units and (A-2) a crystalline aliphatic polyamide resin; and
    5 to 45 wt % of (B-1) a polyamide resin comprising units derived from a xylylenediamine and units derived from an aliphatic dicarboxylic acid; and
from 5 to 200 parts by weight of (C) an inorganic filler.

2. The molding polyamide resin composition of claim 1, wherein ingredient (A-1) comprises a crystalline, partly aromatic copolyamide resin containing one kind of aromatic monomer units and having a melting point of from 260° C. up to 320° C.

3. The molding polyamide resin composition of claim 1, wherein ingredient (A-1) is crystalline, partly aromatic copolyamide formed from an equimolar salt of hexamethylenediamine with adipic acid in the amount of 30–70 wt %, an equimolar salt of hexamethylenediamine with terephthalic acid in the amount of 70–30 wt %, and at least one monomer forming an aliphatic polyamide in the amount of 0–15 wt %.

4. The molding polyamide resin composition of claim 3, wherein the monomer forming an aliphatic polyamide is at least one member selected from the group consisting of 6-aminocaproic acid, ε-caprolactam, 11-aminoundecanoic acid, 12-aminododecanoic acid, and laurolactam.

5. The molding polyamide resin composition of claim 1, wherein ingredient (A-2) is a crystalline aliphatic polyamide resin formed from an aliphatic diamine and an aliphatic dicarboxylic acid or from a lactam.

6. The molding polyamide resin composition of claim 1, wherein the inorganic filler (C) is glass fibers.

7. A molding polyamide resin composition which comprises 100 parts by weight of a polyamide resin comprising
    95 to 55 wt % of at least one resin selected from the group consisting of (A-1) a crystalline, partly aromatic copolyamide resin containing one kind of aromatic monomer units and (A-2) a crystalline aliphatic polyamide resin; and
    5 to 45 wt % of (B-2) a noncrystalline, partly aromatic copolyamide resin containing at least two kinds of aromatic monomer units; and
from 5 to 200 parts by weight of (C) an inorganic filler.

8. The molding polyamide resin composition of claim 7, wherein the polyamide resin comprises (A-1) a crystalline, partly aromatic copolyamide resin containing one kind of aromatic monomer units and having a melting point of from 260° C. to up to 320° C., and
    (B-2) a noncrystalline, partly aromatic copolyamide resin containing one kind of aromatic monomer unit and having a melting point of 300° C. or higher.

9. The molding polyamide resin composition of claim 7 wherein ingredient (A-1) is a crystalline, partly aromatic copolyamide formed from an equimolar salt of hexamethylenediamine with adipic acid in the amount of 30–70 wt %, an equimolar salt of hexamethylenediamine with terephthalic acid in the amount of 70–30 wt %, and at least one monomer forming an aliphatic polyamide in the amount of 0–15 wt %.

10. The molding polyamide resin composition of claim 9, wherein the monomer forming an aliphatic polyamide is at least one member selected from the group consisting of 6-aminocaproic acid, ε-caprolactam, 11-aminoundecanoic acid, 12-aminododecanoic acid, and laurolactam.

11. The molding polyamide resin composition of claim 7, wherein ingredient (A-2) is a crystalline aliphatic polyamide resin formed from an aliphatic diamine and an aliphatic dicarboxylic acid or from a lactam.

12. The molding polyamide resin composition of claim 7, wherein ingredient (B-2) is a noncrystalline, partly aromatic copolyamide formed from an equimolar salt of hexamethylenediamine with isophthalic acid in the amount of 90–60 wt %, and an equimolar salt of hexamethylenediamine with terephthalic acid in the amount of 10–40 wt %.

13. The molding polyamide resin composition of claim 7, wherein the inorganic filler (C) is glass fibers.

* * * * *